United States Patent [19]

Tanaka et al.

[11] 4,139,513
[45] Feb. 13, 1979

[54] COPOLYMER FOR SOFT CONTACT LENS, ITS PREPARATION AND SOFT CONTACT LENS MADE THEREOF

[75] Inventors: Kyoichi Tanaka; Kouzou Takahashi, both of Nagoya; Mitsuhiro Kanada, Aichi; Shinji Kanome; Tatsutoshi Nakajima, both of Nagoya, all of Japan

[73] Assignee: Toyo Contact Lens Co., Ltd., Nagoya, Japan

[21] Appl. No.: 888,323

[22] Filed: Mar. 20, 1978

[30] Foreign Application Priority Data

Nov. 8, 1977 [JP] Japan ................................. 52-134248

[51] Int. Cl.$^2$ .................. C08F 220/28; C08F 230/08; G02C 7/04
[52] U.S. Cl. ...................... 260/29.6 TA; 204/159.22; 351/160 R; 526/218; 526/232; 526/264; 526/279
[58] Field of Search ............... 526/264, 279, 218, 232; 204/159.22; 351/160; 260/29.6 TA

[56] References Cited

U.S. PATENT DOCUMENTS

| | | | |
|---|---|---|---|
| 3,787,380 | 1/1974 | Stamberger | 526/264 |
| 3,937,680 | 2/1976 | de Carle | 526/264 |
| 3,951,893 | 4/1976 | Gander | 526/279 |
| 4,022,754 | 5/1977 | Howes et al. | 526/264 |

FOREIGN PATENT DOCUMENTS 52-33502  8/1977  Japan.

*Primary Examiner*—Harry Wong, Jr.
*Attorney, Agent, or Firm*—Armstrong, Nikaido, Marmelstein & Kubovcik

[57] ABSTRACT

A copolymer suitable for use as soft contact lenses, comprising a polymerization product of (a) at least one monomer selected from methyldi(trimethylsiloxy)sylylpropylglycerol methacrylate and methyldi(trimethylsiloxy)sylylpropylglycerolethyl methacrylate, (b) a hydrophilic monomer and (c) a cross-linking agent having at least two copolymerizable functional groups. Soft contact lens made of the above copolymer has excellent oxygen permeability in spite of low water content and can be comfortably worn continuously for a long term without a foreign body sensation and pain.

12 Claims, No Drawings

COPOLYMER FOR SOFT CONTACT LENS, ITS PREPARATION AND SOFT CONTACT LENS MADE THEREOF

BACKGROUND OF THE INVENTION

The present invention relates to a novel copolymer and the preparation thereof, and more particularly to a copolymer suitable for use in soft contact lenses.

The present invention also relates to soft contact lenses having low water content which can be worn continuously for a long period of time without pain, and more particularly to low water content soft contact lenses made of a novel copolymer having an excellent oxygen permeability which is increased by introducing a siloxane bond at branching chain ends of a polymer chain.

Typical examples of known soft contact lenses developed with the object for continuous wear for a long term are silicone rubber contact lenses prepared from polydimethyl siloxane as a main component and high water content contact lenses prepared from poly-N-vinyl pyrrolidone as a main component.

Since the silicone rubber contact lenses are very water-repellent and greatly different from cornea in thermal properties such as thermal conductivity and thermal diffusivity, they give a foreign body sensation, particularly a burning sensation despite having a large oxygen permeability. Therefore, there is required a strong patience to accommodate to the silicone rubber lenses. Further, the silicone rubber is so soft and elastic that they are subjected to precise mechanical treatments such as cutting, grinding and polishing with difficulty. Also, many attempts for making the surface of silicone rubber lenses hydrophilic have been undertaken, but no satisfactory contact lense has been developed.

Since the high water content contact lenses contain about 60% to about 80% by weight of water, they have the disadvantages that (1) they are weaker in quality of material than low water content contact lenses, (2) they are easily contaminated with inorganic and organic compounds in tears which penetrate and accumulate into the lenses during the use and (3) they are bad in maintenance of lens contour due to the evaporation of water during the use and, therefore, the refractive power thereof easily changes.

Also, there is proposed soft contact lenses prepared from polyethyleneglycol monomethacrylate (i.e. poly-2-hydroxyethyl methacrylate) as a main component. However, the water content of these contact lenses is usually at most 40% by weight and the oxygen permeability is insufficient. Therefore, these contact lenses have the defect that they cannot be worn continuously for a long time.

As stated above, conventional soft contact lenses are not necessarily suitable for continuous wear for a long term.

OBJECTS OF THE INVENTION

It is an object of the present invention to provide a novel copolymer suitable for use in soft contact lenses.

A further object of the invention is to provide a soft contact lens which can be continuously worn for a long term.

A still further object of the invention is to provide a soft contact lens which can be worn comfortably without giving a foreign body sansation and pain.

Another object of the invention is to provide a soft contact lens having an excellent oxygen permeability in spite of relatively low water content.

These and other objects of the invention will become apparent from the description hereinafter.

DETAILED DESCRIPTION

It has now been found that the above-mentioned objects can be attained by a polymerization product consisting essentially of (a) 15 to 50% by weight of at least one monomer selected from the group consisting of methyldi(trimethylsiloxy)sylylpropylglycerol methacrylate having the following formula [I]

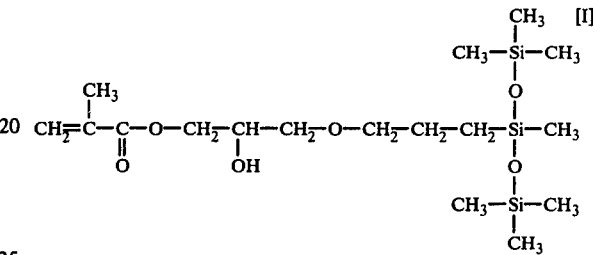

and methyldi(trimethylsiloxy)sylylpropylglycerolethyl methacrylate having the following formula [II]

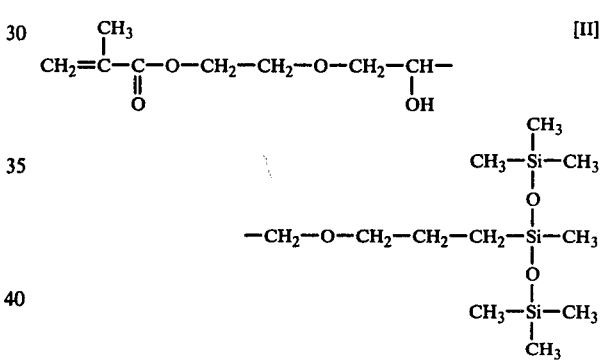

(b) 50 to 85% by weight of a hydrophilic monomer, and
(c) 0.3 to 2.0% by weight of a cross-linking agent having at least two copolymerizable functional groups.

The above novel copolymers of the present invention can absorb and contain water. When containing water in saturation, the water content of the copolymers of the invention is from 15 to 50% by weight. Despite such a low water content, however, the copolymers of the invention show excellent oxygen permeation and have a high oxygen permeability of $7.0 \times 10^{-10}$ to $24.0 \times 10^{-10}$ ml.cm./cm.$^2$sec.cmHg. Therefore, the copolymers of the present invention are very suitable as a material of soft contact lenses which can be worn continuously for a long term. The soft contact lenses made of the copolymers of the present invention lie in intermediate position between the silicone rubber contact lenses and the high water content contact lenses. The defects of the silicone rubber lenses and high water content lenses have been eliminated by utilizing the excellent property of oxygen permeation of the siloxane bond and moderately lowering the water content. Consequently, the soft contact lenses of the present invention can be comfortably worn continuously for a long term.

The feature of the present invention lies in the use of methyldi(trimethylsiloxy)silylpropylglycerol methacrylate of the formula [I] (hereinafter referred to as "SiGMA") and/or methyldi(trimethylsiloxy)sylylpropylglycerolethyl methacrylate of the formula [II] (hereinafter referred to as "SiGEMA"), which are employed as a hydrophobic monomer.

As seen in the structural formula [I] and [II], SiGMA and SiGEMA contain in the molecule a siloxane bond which is hydrophobic, and a hydroxyl group and an ether bond which are hydrophilic. The siloxane bond has a function of raising the oxygen permeability of the obtained copolymer. However, in general, polymers prepared from a monomer containing siloxane bond, particularly monomer containing siloxane bond but no hydrophilic group in the molecule have the strong water-repellent property. Therefore, such polymers cannot be employed as a material of contact lens, unless the monomer is copolymerized with a hydrophilic monomer. On the other hand, in order to raise the oxygen permeability of a copolymer of a hydrophobic monomer and a hydrophilic monomer, it is necessary to increase the number of the siloxane bonds in the polymer chain. However, the more the number of the siloxane bonds in the polymer chain increases, the stronger the undesirable water-repellent property becomes. For this reason, a larger amount of a hydrophilic monomer must be copolymerized. However, a hydrophobic monomer having no hydrophilic group is hard to copolymerize with a hydrophilic monomer and, therefore, when a large amount of the hydrophilic monomer is employed, the produced copolymer becomes opaque. This is fatal defect in use as a material of contact lens.

In contrast, SiGMA and SiGEMA employed in the present invention have hydroxyl group and ether bond in the molecule, which are hydrophilic. Therefore, SiGMA and SiGEMA are miscible with a hydrophilic monomer in all proportions and also easily copolymerizable therewith. The copolymer obtained by using SiGMA and/or SiGEMA are colorless and transparent even at the time of containing water.

In the present invention, for obtaining the copolymer having an oxygen permeability sufficient for long-term, continuous wear of the contact lens despite a low water content, it is preferred to employ 15 to 50% by weight of SiGMA and/or SiGEMA based on the total weight of the monomers employed. When the amount of SiGMA and/or SiGEMA is less than the above range, the oxygen permeability of the obtained copolymer is low. On the other hand, when the amount is larger than the above range, the obtained copolymer is suitable for only a hard type contact lenses having extremely low water content.

In the present invention, the hydrophilic monomer is employed to provide the contact lens with the hydrophilic property. Examples of the hydrophilic monomer employed in the present invention are ethylene glycol monomethacrylate, diethylene glycol monomethacrylate, triethylene glycol monomethacrylate, N-vinyl pyrrolidone and dimethyl acrylamide. When SiGMA and/or SiGEMA are employed in a large amount, it is preferable to employ N-vinyl pyrrolidone or dimethyl acrylamide which has a strong hydrophilic property so that the obtained copolymer has a proper hydrophilic property. Also, when it is desired to obtain the copolymers of low water content, particularly the copolymers which can contain only at most 15 to 20% by weight, ethylene glycol monomethacrylate is preferably employed. The above hydrophilic monomers may be employed singly or in admixture thereof. Usually, it is preferred to employ the hydrophilic monomers rather in admixture thereof than singly. The amount of the hydrophilic monomer employed is from 50 to 85% by weight based on the total weight of the monomers employed. When the amount of the hydrophilic monomer is less than 50% by weight, water content of the obtained copolymer is low and, therefore, the copolymer is semi-soft. Also, when the amount is more than 85% by weight, the obtained copolymer is so highly water-retainable that a contact lens made thereof is unstable in shape.

The contact lenses of the present invention are soft type and, therefore, it is necessary to stabilize the lens contour by providing the copolymer with a cross-linking structure. For this reason, in the present invention, a cross-linkable monomer having at least two copolymerizable functional groups (which is hereinafter referred to as "cross-linking agent") is copolymerized with the above-mentioned monomers (a) and (b). Examples of the cross-linking agent employed in the present invention are ethylene glycol dimethacrylate, diethylene glycol dimethacrylate, triethylene glycol dimethacrylate, allyl methacrylate, divinyl benzene, diallyl phthalate and trimethylolpropane trimethacrylate. These cross-linking agents may be employed singly or in admixture thereof. The amount of the cross-linking agent employed in the present invention is from 0.3 to 2.0% by weight based on the total weight of the monomers. When the amount is less than the above range, the stability of the lens contour at the time of containing water is bad, and when the amount is more than the above range, the flexibility which is the advantage of the soft contact lenses decreases and the lenses become brittle.

The polymerization of the above-mentioned monomers (a), (b) and (c) is carried out by employing free radical polymerization initiators which are conventionally employed in the polymerization of unsaturated hydrocarbons. Examples of the free radical polymerization initiator employed in the present invention are benzoyl peroxide, azobisisobutyronitrile and azobisdimethylvaleronitrile. These initiators may be employed singly or in admixture thereof. The initiator is usually employed in an amount of 0.05 to 0.5 part by weight to 100 parts by weight of the monomer mixture.

The copolymers of the present invention are prepared by copolymerizing 15 to 50% by weight of the above-mentioned monomer (a), 50 to 85% by weight of the above-mentioned monomer (b) and 0.3 to 2.0% by weight of the above-mentioned monomer (c), these monomer percents being based on the total weight of the monomers (a), (b) and (c), in the presence of 0.05 to 0.5 part by weight of the above-mentioned initiator to 100 parts by weight of the mixture of the monomers (a), (b) and (c). In the present invention, any polymerization systems are applicable, and the bulk polymerization is particularly preferred by the reason that the obtained copolymer can be directly employed as a material of contact lens as it is.

The polymerization is carried out in a conventional manner. For instance, in case of the polymerization using ultraviolet ray, the monomers are first polymerized under the ultraviolet irradiation at a temperature of 15° to 50° C. for about 20 to about 40 hours, and then thermally polymerized without the ultraviolet irradiation at a temperature of 50° to 120° C. for about 20 to about 70 hours. In that case, the polymerization may be carried out by stepwise raising the temperature. For instance, the monomers are polymerized under the ultraviolet irradiation first at 15° C. for about 16 hours, and at 35° C. for about 4 hours and finally at 45° C. for about 4 hours, and then thermally polymerized without the ultraviolet irradiation at 60° C. for about 12 hours, and at 80° C. for about 4 hours, and at 100° C. for about 4 hours and further at 120° C. for about 4 hours. When carrying out the polymerization by only thermal polymerization technique, the polymerization is usually carried out at a temperature of 40° to 120° C. for about 60 to about 110 hours, and may be, of course, carried out stepwise. For instance, the polymerization is carried out first at 40° C. for about 64 hours, and at 60° C. for about 24 hours, and at 80° C. for about 4 hours, and at 100° C. for about 4 hours, and finally at 120° C. for about 4 hours. The polymerization of the monomers has been explained with reference to some instances, but it is to be understood that the polymerization conditions are not limited to such temperature and time conditions and the use of ultraviolet ray.

The cast polymerization is suitable for preparing contact lenses. The polymerization may be conducted in a mold having a shape of contact lens by the bulk polymerization technique, and the resulting lens having nearly desired shape is finished to a contact lens by a usual mechanical processing. Also, the monomer mixture may be thermally polymerized in an appropriate mold or vessel to give a block, sheet or rod, and it may be then mechanically treated in a conventional manner to give a contact lens of a desired shape. The thus prepared contact lenses are then soaked and swollen in a physiological saline solution to give the soft contact lenses of the present invention.

The thus prepared copolymer is novel and has approximately the same composition as that of the monomer mixture employed. That is to say, the copolymer consists essentially of (a) 15 to 50% by weight of SiGMA and/or SiGEMA units, (b) 50 to 85% by weight of the hydrophilic monomer units and (c) 0.3 to 2.0% by weight of the cross-linking agent units.

The copolymer of the present invention has the improved oxgen permeability despite a low water content, as compared with a soft contact lens material including polyethylene glycol monomethacrylate as a main component. For instance, the copolymer of the invention prepared by polymerizing 25 parts by weight of SiGMA, 52 parts by weight of ethylene glycol monomethacrylate, 22 parts by weight of N-vinyl pyrrolidone and 1 part by weight of ethylene glycol dimethacrylate and then making the copolymer absorb water has the oxgen permeability of about $10.8 \times 10^{-10}$ ml.cm./cm.$^2$sec.cmHg, despite low water content of about 22.5% by weight. On the other hand, a conventional soft contact lens material including polyethylene glycol monomethacrylate as a main component, which contains about 35% by weight of water, has the oxgen permeability of about $5.6 \times 10^{-10}$ ml.cm./cm.$^2$sec.cmHg. Also, the copolymer of the present invention prepared by polymerizing 25 parts by weight of SiGMA, 37 parts by weight of ethylene glycol monomethacrylate, 37 parts by weight of N-vinyl pyrrolidone and 1 part by weight of ethylene glycol dimethaerylate, which contains 35.6% by weight of water, has the oxgen permeability of about $13.2 \times 10^{-10}$ ml.cm./cm.$^2$sec.cmHg. This oxgen permeability is about 2.4 times that of a conventional contact lens made of poly-2-hydroxyethyl methacrylate. This fact means that the copolymer of the present invention has the oxgen permeability necessary for enabling the contact lens made thereof to be worn continuously for a long term. Because, according to Journal of Japan Contact Lens Society, Vol. 12, No. 10, 142(1970), it is reported that a contact lens made of poly-2-hydroxyethyl methacrylate having a thickness of 0.2 mm. can penetrate oxygen about one-half time the required oxgen for cornea in respiration. In fact, according to the present inventor's clinical study in which soft contact lenses of the present invention were continuously worn on albino rabbit eyes for 21 days, no change was observed on corneal surfaces and there was no decrease of glycogen. Also in respect of the histological observation, there was no vascularization, substantial edema and infiltration of inflammatory cells and like this, no morphologically significant change was observed. The soft contact lenses of the present invention employed in this study are those obtained by preparing from the novel copolymers of the invention, contact lenses having a thickness of 0.15 mm., a size of 11.5 mm. and a radius of curvature of inner surface of 7.90 mm., and then soaking and swelling the contact lenses in a physiological saline solution. The reason why the continuous wear was conducted for 21 days is that it is known that the cycle of metabolism of cornea is about 18 days.

The oxgen permeability of the copolymer of the present invention is in proportion to the content of SiGMA and/or SiGEMA and the water content of the copolymer. In the present invention, the water content and the oxgen permeability of the copolymer saturated with water are about 15 to 50% by weight and about $7.0 \times 10^{-10}$ to about $24.0 \times 10^{-10}$ ml.cm./cm.$^2$sec.cmHg, respectively. The refractive index of the copolymer of the invention is not critical, since it varies depending on the kind and amount of the employed monomers, but falls within the range of $n_D^{20}$ 1.43 to 1.49 in dryness and of $n_D^{20}$ 1.39 to 1.47 in saturation with water. Also, the copolymer of the present invention has a specific gravity of from $d_4^{25}$ 1.17 to 1.20 in dryness and from $d_4^{25}$ 1.10 to 1.16 in saturation with water, a visible ray percent transmission of not less than 90% both in dryness and in saturation with water and a rubber hardness of 20 to 50 in saturation with water.

The copolymer of the present invention is very useful for soft contact lenses. The soft contact lenses of the present invention is prepared generally by subjecting moldings prepared directly by cast polymerization as stated before to a known mechanical processing and then soaking in a physiological saline solution to swell the lenses.

In the present invention, the values of the oxgen permeability, refractive index, visible ray percent transmission, rubber hardness and water content are those measured as follows:

The oxygen permeability is measured by an oxygen gas permeameter made by Rikaseiki Kogyo Co., Ltd. by employing specimens having a diameter of 15 mm. and a thickness of 0.1 mm.

The refractive index is measured by Abbe's refractometer made by Erma Optical Works Co., Ltd.

The visible ray percent transmission is measured by Double-Beam Spectro Photometer UV-210 made by Shimadzu Seisakusho Ltd. by employing film specimens having a thickness of 0.15 mm.

The rubber hardness is measured by using a rubber hardness tester, TECLOCK GS-706 made by Teclock Corporation according to Japanese Industrial Standards K-6301.

The water content is calculated according to the following equation:

Water content (% by weight) = [(W − D)/W] × 100

W: Weight of specimen after absorbing water
D: Dry weight of specimen

The present invention is more particularly described and explained by means of the following Example, in which all parts and all percentage are by weight and the properties of the copolymers show those measured by using the copolymers being in saturation with water unless otherwise stated.

In order to illustrate the preparation of SiGMA and SiGEMA, the following Reference Examples are also presented.

REFERENCE EXAMPLE 1

Synthesis of SiGMA
[Methyldi(trimethylsiloxy)sylylpropylglycerol Methacrylate]

A one liter round bottom flask equipped with a magnetic stirrer, a thermometer, a tube for introducing nitrogen gas, a dropping funnel and a reflux condenser was charged with 336 g. of methyldi(trimethylsiloxy)-sylylpropyloxypropylene oxide, 6.5 g. of potassium hydroxide and 0.8 g. of hydroquinone, and was placed on an oil bath. With introducing nitrogen gas into the flask, 172 g. of methacrylic acid was added dropwise to the flask through the dropping funnel with stirring over about 30 minutes. The mixture was then gradually heated to 100° C. and at this temperature the reaction was carried out for about 7 hours. After the completion of the reaction, the reaction mixture was allowed to cool and filtered to remove potassium methacrylate. The filtrate was then admixed with n-hexane in an amount of about 9 times the volume of the filtrate and the mixture was washed several times with a 0.5N aqueous solution of sodium hydroxide to remove the excess methacrylic acid and hydroquinone by employing a separatory funnel, until the aqueous solution became colorless. The mixture was further washed several times with a saline water to remove sodium hydroxide remaining in the mixture. The thus washed mixture was then placed in an Erlenmeyer flask and was dehydrated by employing anhydrous sodium sulfate for a day and night. After removing anhydrous sodium sulfate by filtration, n-hexane was distilled away by an evaporator, first at 50° C., then at 50° C. with suction by an aspirator and further at 65° C. with reducing a pressure to 10 mmHg by a vacuum pump.

The thus obtained reaction product was a slightly viscous, transparent liquid. According to the quantitative analysis by gas chromatography, the purity of the obtained product was 98.7%.

Also, the refractive index $n_D^{20}$ of the product was 1.4546.

The infrared absorption spectrum of the product indicated absorptions of —OH group at 3,420 cm.$^{-1}$, of double bond at 1,640 cm.$^{-1}$, of ester bond at 1,720 cm.$^{-1}$, of Si-O-Si bond at 1,080 cm.$^{-1}$ and 1,040 cm.$^{-1}$, of -CH$_3$ group at 2,950 cm.$^{-1}$, 1,400 cm.$^{-1}$ and 1,300 cm.$^{-1}$, and of —Si—(CH$_3$)$_3$ group at 845 cm.$^{-1}$. No absorption of epoxy group at 910 cm.$^{-1}$ was observed.

The result of the elemental analysis was as follows:

Calculated for $C_{17}H_{38}O_6Si_3$: C 48.3%; H 9.0%
Found: C 49.7%; H 9.3%

From the above results, it was confirmed that the product was SiGMA.

REFERENCE EXAMPLE 2

Synthesis of SiGEMA
[Methyldi(trimethylsiloxy)sylylpropylglycerolethyl Methacrylate]

A one liter four neck round bottom flask equipped with a magnetic stirrer, a thermometer, a tube for introducing nitrogen gas, a dropping funnel and a reflux condenser was charged with 260 g. of ethylene glycol monomethacrylate, 7 g. of triethylamine and 4 g. of hydroquinone. With introducing nitrogen gas into the flask, 336 g. of methyldi(trimethylsiloxy)sylylpropyloxypropylene oxide was added dropwise to the flask through the dropping funnel with stirring. The mixture was then gradually heated to 85° C. and at this temperature the reaction was carried out for about 6 hours. After the completion of the reaction, the reaction mixture was allowed to cool and then admixed with a large quantity of n-hexane. The mixture was washed several times with a 0.5N aqueous solution of sodium hydroxide by employing a separatory funnel until the aqueous solution became colorless, and further washed with a saline water until it was neutral. After dehydrating by anhydrous sodium sulfate for a day and night, the mixture was filtered and then n-hexane was removed by an evaporator. The thus purified reaction product was a slightly viscous, yellow-tinged, transparent liquid.

According to the quantitative analysis by gas chromatography, the purity was over 93%.

Also, the refractive index $n_D^{20}$ of the product was 1.4372.

The infrared absorption spectrum of the product indicated absorptions of —OH group at 3,420 cm.$^{-1}$, of double bond at 1,640 cm.$^{-1}$, of ester bond at 1,720 cm.$^{-1}$, of Si—O—Si bond at 1,080 cm.$^{-1}$ and 1,040 cm.$^{-1}$, and of —Si—(CH$_3$)$_3$ group at 845 cm.$^{-1}$.

The result of the elemental analysis was as follows:
Calculated for $C_{19}H_{42}O_7Si_3$: C 48.9%; H 9.0%
Found: C 47.2%; H 8.7%

From the above results, it was confirmed that the product was SiGEMA.

EXAMPLE 1

Twenty-five grams of SiGMA, 52 g. of ethylene glycol monomethacrylate, 22 g. of N-vinyl pyrrolidone, 1 g. of ethylene glycol dimethacrylate and 0.08 g. of azobisdimethylvaleronitrile were thoroughly admixed and then placed in a test tube made of polypropylene. Under the ultraviolet irradiation, the polymerization was carried out stepwise at 15° C. for 16 hours, at 35° C. for 4 hours and at 45° C. for 4 hours, and then the ultraviolet irradiation was stopped and the thermal polymerization was further carried out stepwise at 60° C. for 12 hours, at 80° C. for 4 hours, at 100° C. for 4 hours and at 120° C. for 4 hours to give a colorless, transparent rod.

From the thus obtained material for contact lens in the form of rod, a piece having a diameter of 15 mm. and a thickness of 0.1 mm. was obtained by mechanical processing, and after the piece was soaked and swollen in a physiological saline solution, the oxygen permeability thereof was measured. The oxgen permeability was 10.8 × 10$^{-10}$ ml.cm./cm.$^2$sec.cmHg.

The material in the form of rod was subjected to a usual mechanical processing such as cutting, grinding and polishing to give contact lenses having a base-curve of 7.90 mm., a front-curve of 8.00 mm., a center thickness of 0.11 mm. and a size of 11.5 mm. The thus obtained contact lenses were soaked and swollen in a physiological saline solution, and then washed and sterilized by boiling therein to give soft contact lenses. The thus prepared soft contact lenses were worn on albino rabbit eyes continuously for 21 days. No change was observed on the eyes.

Also, the soft contact lenses had a refractive index $n_D^{20}$ of 1.4594 and a saturation water content of 22.5%.

EXAMPLES 2 AND 3

The procedures of Example 1 were repeated except that the amounts of ethylene glycol monomethacrylate, ethylene glycol dimethacrylate and N-vinyl pyrrolidone were changed as shown in Table 1 to give copolymers.

The properties of the obtained copolymers are shown in Table 1.

Table 1

| Example No. | Composition SiGMA (parts) | EGMA (parts) | N—VP (parts) | EDMA (parts) | Refractive index $n_D^{20}$ | Water Content % | Oxygen permeability ml . cm . /cm² . sec . cmHg |
|---|---|---|---|---|---|---|---|
| 2 | 25 | 52.2 | 22.3 | 0.5 | 1.4540 | 24.04 | 11.3 × 10⁻¹⁰ |
| 3 | 25 | 51.4 | 22.1 | 1.5 | 1.4568 | 21.08 | 9.8 × 10⁻¹⁰ |

(Note)
EDMA: Ethylene glycol monomethacrylate
N—VP: N-vinyl pyrrolidone
EDMA: Ethylene glycol dimethacrylate The obtained copolymers in the form of rod were colorless and transparent, and had a sufficient hardness for cutting, grinding and polishing. The copolymers were subjected to a usual mechanical processing to give contact lenses having a desired shape. The obtained contact lenses were soaked and swollen in a physiological saline solution, and then washed and sterilized by boiling therein to give soft contact lenses.

The thus prepared soft contact lenses were worn on rabbit eyes to study a possibility of continuous wear for a long term. The soft contact lenses having a thickness of not more than 0.15 mm. could be continuously worn for a long term.

EXAMPLES 4 TO 7

The procedures of Example 1 were repeated except that the amounts of SiGMA, ethylene glycol monomethacrylate and N-vinyl pyrrolidone were changed as shown in Table 2 to give copolymers.

The properties of the obtained copolymers are shown in Table 2.

Table 2

| Example No. | Composition SiGMA (parts) | EGMA (parts) | N—VP (parts) | EDMA (parts) | Refractive index $n_D^{20}$ | Water content % | Oxygen permeability ml . cm . /cm² . sec . cmHg |
|---|---|---|---|---|---|---|---|
| 4 | 17 | 56.8 | 25.2 | 1 | 1.4500 | 29.8 | 9.7 × 10⁻¹⁰ |
| 5 | 20 | 55.0 | 24.0 | 1 | 1.4531 | 26.7 | 10.5 × 10⁻¹⁰ |
| 6 | 35 | 44.8 | 19.2 | 1 | 1.4596 | 19.4 | 11.8 × 10⁻¹⁰ |
| 7 | 45 | 37.8 | 16.2 | 1 | 1.4641 | 16.1 | 15.6 × 10⁻¹⁰ |

The obtained copolymers in the form of rod were colorless and transparent, and had a hardness sufficient for cutting, grinding and polishing. The copolymers were subjected to a usual mechanical processing to give contact lenses having a desired shape. The obtained contact lenses were soaked and swollen in a physiological saline solution, and then washed and sterilized by boiling therein to give soft contact lenses.

The thus prepared soft contact lenses were worn on rabbit eyes to study a possibility of continuous wear for a long term. Every soft contact lenses having a thickness of 0.10 to 0.25 mm. could be continuously worn for a long term. Particularly, the soft contact lenses made of the copolymers of Examples 6 and 7 had an excellent oxygen permeability despite low water content.

EXAMPLES 8 TO 11

The procedures of Example 1 were repeated except that the amounts of ethylene glycol monomethacrylate and N-vinyl pyrrolidone were changed as shown in Table 3 to give copolymers.

The properties of the obtained copolymers are shown in Table 3.

Table 3

| Example No. | Composition SiGMA (parts) | EGMA (parts) | N—VP (parts) | EDMA (parts) | Refractive index $n_D^{20}$ | Water content % | Oxygen permeability ml . cm . /cm² . sec . cmHg |
|---|---|---|---|---|---|---|---|
| 8 | 25 | 74 | — | 1 | 1.4586 | 21.8 | 9.9 × 10⁻¹⁰ |
| 9 | 25 | 66.6 | 7.4 | 1 | 1.4590 | 22.0 | 9.4 × 10⁻¹⁰ |
| 10 | 25 | 37 | 37 | 1 | 1.4398 | 35.6 | 13.2 × 10⁻¹⁰ |
| 11 | 25 | 22 | 52 | 1 | 1.4257 | 44.0 | 16.5 × 10⁻¹⁰ |

The obtained copolymers in the form of rod were colorless and transparent, and had a hardness sufficient for cutting, grinding and polishing. The copolymers were subjected to a usual mechanical processing to give contact lenses with a desired shape. The obtained contact lenses were soaked and swollen in a physiological saline solution, and then washed and sterilized by boiling therein to give soft contact lenses.

The thus prepared soft contact lenses were worn on rabbit eyes to study a possibility of continuous wear for a long term. The soft contact lenses having a thickness of 0.10 to 0.30 mm. could be continuously worn for a long term.

EXAMPLE 12

Fourty grams of SiGMA, 12 g. of ethylene glycol monomethacrylate, 48 g. of N-vinyl pyrrolidone, 0.5 g. of ethylene glycol dimethacrylate and 0.1 g. of azobisisobutyronitril were thoroughly admixed and placed in a test tube made of polypropylene. The thermal polymerization was carried out stepwise at 40° C. for 24 hours, at 60° C. for 24 hours, at 80° C. for 12 hours, at 100° C. for 8 hours and finally at 120° C. for 12 hours to give a colorless, transparent rod.

From the thus obtained material for contact lens in the form of rod, a piece having a diameter of 15 mm. and a thickness of 0.1 mm. was prepared by a mechanical processing. After the piece was soaked and swollen in a physiological saline solution, the oxygen permeability thereof was measured. The oxygen permeability was $19.5 \times 10^{-10}$ ml.cm./cm.$^2$sec.cmHg. The material in the form of rod was subjected to a usual mechanical processing to give contact lenses having a base-curve of 7.90 mm., a front-curve of 8.00 mm., a center thickness of 0.11 mm. and a size of 11.5 mm. The obtained contact lenses were soaked and swollen in a physiological saline solution, and then washed and sterilized by boiling therein to give soft contact lenses. The thus prepared soft contact lenses were worn on albino rabbit eyes continuously for 21 days. No change was observed on the eyes.

Also, the soft contact lenses had a refractive index $n_D^{20}$ of 1.4382 and a saturation water content of 38.0 %.

EXAMPLES 13 TO 15

The procedures of Example 12 were repeated except that the amounts of SiGMA, ethylene glycol monomethacrylate and N-vinyl pyrrolidone were changed as shown in Table 4 to give copolymers.

The properties of the copolymers were shown in Table 4.

EXAMPLES 16 AND 17

The procedures of Example 12 were repeated except that SiGEMA was employed instead of SiGMA in an amount shown in Table 5, and that the amounts of ethylene glycol monomethacrylate and N-vinyl pyrrolidone were changed as shown in Table 5 to give copolymers.

The properties of the copolymers were shown in Table 5.

Table 5

| Example No. | Composition SiGEMA | EGMA | N—VP | EDMA | Refractive index $n_D^{20}$ | Water content % | Oxygen permeability ml . cm . /cm$^2$ . sec . cmHg |
|---|---|---|---|---|---|---|---|
| | parts | | | | | | |
| 16 | 40 | 6 | 54 | 0.5 | 1.4343 | 39.6 | $20.5 \times 10^{-10}$ |
| 17 | 48 | 7 | 45 | 0.5 | 1.4442 | 31.3 | $20.4 \times 10^{-10}$ |

The obtained copolymers in the form of rod were colorless and transparent, and had a hardness sufficient for cutting, grinding and polishing. The copolymers were subjected to a usual mechanical processing to give contact lenses with a desired shape. The obtained contact lenses were soaked and swollen in a physiological saline solution, and then washed and sterilized by boiling therein to give soft contact lenses.

As a result of wear on rabbit eyes, it was observed that every soft contact lenses could be continuously worn for a long term.

EXAMPLE 18

Twenty-four grams of SiGMA, 24 g. of SiGEMA, 52 g. of N-vinyl pyrrolidone, 0.3 g. of ethyl glycol dimethacrylate and 0.08 g. of azobisisobutyronitril were thoroughly admixed and placed in a test tube made of polypropylene. The monomers were polymerized at 15° C. for 16 hours, at 35° C. for 4 hours and further at 45° C. for 4 hours under the ultraviolet irradiation, and then thermally polymerized without ultraviolet irradiation at 60° C. for 12 hours, at 80° C. for 4 hours, at 100° C. for 4 hours and finally at 120° C. for 4 hours to give a colorless, transparent rod.

From the rod, the same contact lenses as in Example 1 were obtained by a usual mechanical processing. The contact lenses were soaked and swollen in a physiological saline solution, and then washed and sterilized by boiling therein to give soft contact lenses.

The thus prepared soft contact lenses were continuously worn on rabbit eyes for 21 days. Continuous wear of this contact lens was possible.

Table 4

| Example No. | Composition SiGMA | EGMA | N—VP | EDMA | Refractive index $n_D^{20}$ | Water content % | Oxygen permeability ml . cm . /cm$^2$ . sec . cmHg |
|---|---|---|---|---|---|---|---|
| | parts | | | | | | |
| 13 | 40 | — | 60 | 0.5 | 1.4340 | 41.1 | $21.6 \times 10^{-10}$ |
| 14 | 48 | 12 | 40 | 0.5 | 1.4475 | 29.8 | $20.1 \times 10^{-10}$ |
| 15 | 48 | — | 52 | 0.5 | 1.4452 | 32.5 | $21.1 \times 10^{-10}$ |

The obtained copolymers in the form of rod were colorless and transparent, and had a hardness sufficient for cutting, grinding and polishing. The copolymers were subjected to a usual mechanical processing to give contact lenses with a desired shape. The obtained contact lenses were soaked and swollen in a physiological saline solution, and then washed and sterilized by boiling therein to give soft contact lenses.

The thus prepared soft contact lenses were worn on rabbit eyes to study a possibility of continuous wear for a long term. Every soft contact lenses could be continuously worn for a long term.

Also, the soft contact lens had a refractive index $n_D^{20}$ of 1.4416, a saturation water content of 34.1% and the oxygen permeability of $23.0 \times 10^{-10}$ ml.cm./cm.$^2$sec.cmHg.

What we claim is:
1. A polymerization product of
   (a) 15 to 50% of at least one monomer selected from the group consisting of methyldi(trimethylsiloxy)-sylylpropylglycerol methacrylate having the following formula

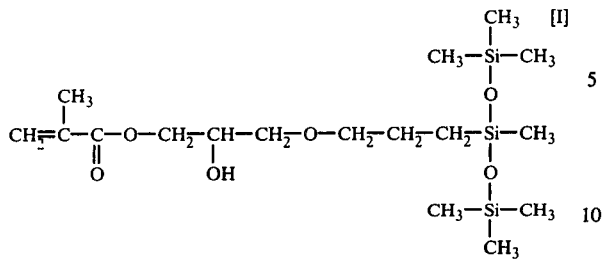

and methyldi(trimethylsiloxy)sylylpropylglycerolethyl methacrylate having the following formula

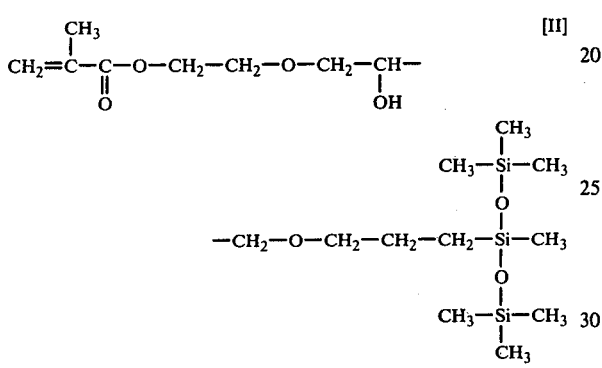

(b) 50 to 85% of at least one hydrophilic monomer selected from the group consisting of ethylene glycol monomethacrylate, diethylene glycol monomethacrylate, triethylene glycol monomethacrylate, N-vinyl pyrrolidone and dimethyl acrylamide, and (c) 0.3 to 2.0% of at least one cross-linking agent having at least two copolymerizable functional groups selected from the group consisting of ethylene glycol dimethacrylate, diethylene glycol dimethacrylate, triethylene glycol dimethacrylate, allyl methacrylate, divinyl benzene, diallyl phthalate and trimethylolpropane trimethacrylate, said % of (a), (b) and (c) being % by weight based on the total weight of (a), (b) and (c).

2. The polymerization product of claim 1, having a refractive index of $n_D^{20} = 1.43$ to 1.49.

3. The polymerization product of claim 1, having a refractive index of $n_D^{20} = 1.39$ to 1.47, a water content of 15 to 50% by weight and an oxygen permeability of $7.0 \times 10^{-10}$ to $24.0 \times 10^{-10}$ ml.cm./cm.$^2$cmHg, at the time of containing water in saturation.

4. A process for preparing a copolymer which comprises bulk-polymerizing (a) 15 to 50% of at least one monomer selected from the group consisting of methyldi(trimethylsiloxy)sylylpropylglycerol methacrylate having the following formula

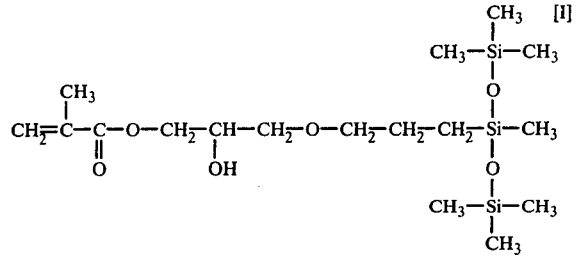

and methyldi(trimethylsiloxy)sylylpropylglycerolethyl methacrylate having the following formula

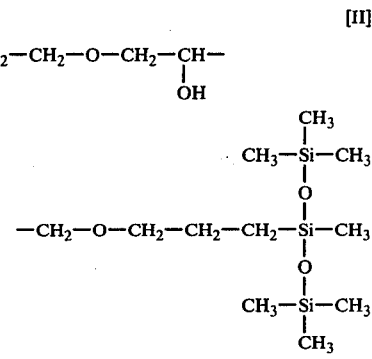

(b) 50 to 85% of a hydrophilic monomer, and (c) 0.3 to 2.0% of a cross-linking agent having at least two copolymerizable functional groups, in the presence of 0.05 to 0.5 part by weight, per 100 parts by weight of the mixture of (a), (b) and (c), of a free radical polymerization initiator, said % of (a), (b) and (c) being % by weight based on the total weight of (a), (b) and (c).

5. The process of claim 4, wherein the bulk polymerization is thermally carried out for about 60 to about 110 hours by stepwise raising the temperature from 40° to 120° C.

6. The process of claim 4, wherein the bulk polymerization is carried out first under the ultraviolet irradiation for about 20 to about 40 hours by stepwise raising the temperature from 15° to 50° C., and then thermally carried out without the ultraviolet irradiation for about 20 to 70 hours by stepwise raising the temperature from 50° to 120° C.

7. The process of claim 4, wherein said free radical polymerization initiator is at least one member selected from the group consisting of benzoyl peroxide, azobisisbutyronitrile and azobisdimethylvaleronitrile.

8. A contact lens made of a copolymer consisting essentially of (a) 15 to 50% by weight of units of at least one monomer selected from the group consisting of methyldi(trimethylsiloxy)sylylpropylglycerol methacrylate having the following formula

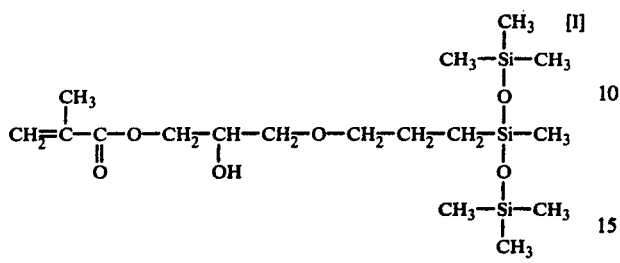

and methyldi(trimethylsiloxy)sylylpropyl-glycerolethyl methacrylate having the following formula

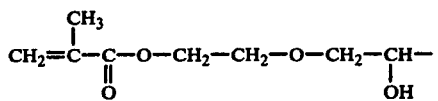

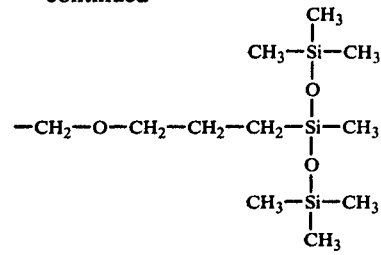

(b) 50 to 85% by weight of hydrophilic monomer units, and
(c) 0.3 to 2.0% by weight of units of a cross-linking agent having at least two copolymerizable functional groups.

9. The contact lens of claim 8, wherein said hydrophilic monomer is at least one member selected from the group consisting of ethylene glycol monomethacrylate, diethylene glycol monomethacrylate, triethylene glycol monomethacrylate, N-vinyl pyrrolidone and dimethyl acrylamide.

10. The contact lens of claim 8, wherein said cross-linking agent is at least one member selected from the group consisting of ethylene glycol dimethacrylate, diethylene glycol dimethacrylate, triethylene glycol dimethacrylate, allyl methacrylate, divinyl benzene, diallyl phthalate and trimethylolpropane trimethacrylate.

11. The contact lens of claim 8, having a refractive index of $n_D^{20} = 1.43$ to $1.49$.

12. The contact lens of claim 8, having a refractive index of $n_D^{20} = 1.39$ to $1.47$, a water content of 15 to 50% by weight and an oxygen permeability of $7.0 \times 10^{-10}$ to $24.0 \times 10^{-10}$ ml.cm./cm.$^2$cmHg, at the time of containing water in saturation.

* * * * *